United States Patent Office 3,676,165
Patented July 11, 1972

3,676,165
SAND-LIME BRICKS AND PROCESS FOR MAKING THEM
Alfred Schneider-Arnoldi, Krefeld, Friedrich-Wilhelm Kampmann, Liblar, Hans-Dieter Thiel, Hurth, near Cologne, Joachim Kandler, Lechenich, and Dietrich Gleisberg, Hurth, near Cologne, Germany, assignors to Knapsack Aktiengesellschaft, Knapsack, near Cologne, Germany
No Drawing. Filed Apr. 20, 1970, Ser. No. 30,333
Claims priority, application Germany, Apr. 23, 1969,
P 19 20 488.7
Int. Cl. C04b 7/20
U.S. Cl. 106—117       4 Claims

ABSTRACT OF THE DISCLOSURE

Novel sand-lime bricks consisting substantially of sand and between 6 and 15 weight percent of a binder. Between 5 and 95 weight percent of the binder is phosphorus furnace slag and the balance is burnt lime or lime hydrate.

---

The present invention relates to novel sand-lime bricks and to a process for making them. comprising mixing sand with lime or hydrate of lime and a phosphorus furnace slag as the binders, adding water to the mixture so produced, shaping crude bricks therefrom and successively hardening the crude bricks.

Bricks can be made from lime and addends which predominantly contain quartz. The components are intimately mixed together, the resulting mixture is compacted by compression or vibration and shaped into bricks which are hardened under vapor pressure.

A conventional process for making bricks comprises moistening between about 8 and 13 parts by weight sand and 1 part by weight burnt lime with 1 part by weight water, and mixing the components together. Following this, the resulting mixture is allowed to stand over a period of between 1 and 3 hours to slake the burnt lime and obtain the hydrate.

It is also possible to substitute stoichiometric proportions of hydrate lime for the burnt lime. While it is necessary in this case to correspondingly reduce the addition of water, it is unnecessary for the mixture to stand, which is homogenized once again and shaped into crude bricks with the use of compression or vibration means. The crude bricks are successively hardened in autoclaves under moist vapor and at pressures of between 8 and 20 atmospheres gauge. The period during which the crude bricks are treated is a function of the pressure applied and lies between 10 and 4 hours. The vapor pressure is slowly reduced, the bricks are removed from the autoclave, allowed to cool and can then be used as building material, provided that they have the necessary strength.

It has now unexpectedly been found that finely ground phosphorus furnace slag having a relatively high $SiO_2$-concentration therein, such as that obtained in the electrothermal production of phosphorus, can advantageously and extensively be substituted for lime or lime hydrate binders. Phosphorus furnace slag is generally composed substantially of:

|  | Percent |
|---|---|
| CaO | 45–55 |
| $SiO_2$ | 40–50 |
| $Al_2O_3$ | 1–5 |
| S (bound) | <0.4 |
| $P_2O_5$ | 0.5–2.0 |
| Alkali metal oxides, about | 1 |

The substitution of a low-grade by-product, such as phosphorus furnace slag, for high-grade burnt lime, is of outstanding commercial interest. The use of finely ground phosphorus furnace slag is also of interest under technical aspects bearing in mind that the formation of the hydrate can be effected more rapidly, with the addition of smaller quantities of burnt lime. Compared with bricks based solely on burnt lime, bricks made from material, in which the lime has been partially replaced by finely ground phosphorus furnace slag, have been found to possess an improved initial strength and, after some weeks, an improved final strength, occasioned by post-hardening phenomena.

The present invention provides more particularly sand-lime bricks consisting substantially of sand in combination with between 6 and 15 weight percent of a binder, of which between 5 and 95 weight percent is phosphorus furnace slag, the balance being burnt lime or hydrate of lime, whereby between 80 and 100 weight percent of the slag preferably consists of particles with a size of smaller than 100 microns, advantageously between 65 and 90 microns, and whereby the slag is substantially composed of between 45 and 55 weight percent CaO, between 40 and 50 weight percent $SiO_2$ and between 1 and 5 weight percent $Al_2O_3$.

The process for making the sand-lime bricks comprises mixing sand with lime or lime hydrate as a binder, adding water to the resulting mixture, shaping the mixture into crude bricks and successively hardening the bricks, the said binder, which is present in a proportion of between 6 and 15 weight percent, based on the dry mixture, being replaced to an extent of between 5 and 95 weight percent, preferably between 25 and 85 weight percent, by phosphorus furnace slag.

The slag preferably has the composition and particle size specified hereinabove.

The crude bricks should conveniently be hardened over a period of between 3 and 20 hours in a moist vapor atmosphere under a pressure of between 4 and 25 atmospheres gauge. It is also good practice to separately weigh firstly the finely ground phosphorus furnace slag and secondly the burnt lime or lime hydrate, and then mix them with the sand.

The following examples illustrate the invention and its advantages.

EXAMPLE 1

1,500 grams sand and 122 grams burnt lime were mixed by hand in a dish with the addition of 120 grams water. The dish was covered and allowed to stand for 1¾ hours. Following this, the mixture was made into 6 cylindrical test specimens 50 mm. wide and 46 mm. high under a press power of about 700 kilopond/square centimeter. The specimens were successively hardened in an autoclave for 4 hours under moist vapor pressure of 20 atmospheres gauge. After cooling, they were tested as to their crushing strength. The average value determined was 81 kilopond/per square centimeter.

EXAMPLE 2

1,500 grams sand were mixed with 61 grams burnt lime and 61 grams ground phosphorus furnace slag (mixing ratio=1:1) with the addition of 79 grams water. The further procedure was the same as that described in Example 1.

After hardening, the test specimens were found to have an average crushing strength of 121 kilopond/square centimeter.

EXAMPLE 3

1,500 grams sand were mixed with 30.5 grams burnt lime and 91.5 grams ground phosphorus furnace slag (mixing ratio=1:3) with the addition of 54 grams water. The further procedure was the same as that described in Example 1. The test specimens were found to have an average crushing strength of 94 kilopond/square centimeter.

We claim:

1. The process for making high strength sand-lime bricks which consists of first mixing an aggregate consisting of sand in a range of 94 to 85 weight percent of the mixture with a binder in a range of 6 to 15 weight percent of the mixture, the said binder consisting of a mixture of between 25 and 85 weight percent finely ground phosphorus furnace slag and between 15 and 75 weight percent burnt lime or lime hydrate, the said phosphorus furnace slage consisting of from 45 to 55% of calcium oxide, 40 to 50% of silicon oxide, from 1 to 5% of aluminum oxide, from 0.5 to 2.0% of phosphorus pentoxide, approximately 1% of alkali metal oxides and less than 0.4% bound sulfur based on dry weight, next adding water to the resultant mixture, shaping the water-containing mixture to bricks and hardening the shaped bricks for from 3 to 20 hours in a moist vapor atmosphere under a pressure of between 4 and 25 atmospheres and then cooling the product bricks.

2. The process as claimed in claim 1, wherein between 80 to 100 weight percent of the said finely ground phosphorus furnace slag have a particle size smaller than 100 microns.

3. The process as claimed in claim 2, wherein between 80 to 100 weight percent of the said finely ground phosphorus furnace slag have a particle size of between 65 and 90 microns.

4. As a new article of manufacture, a high strength sand-lime brick prepared in accordance with the process of claim 1.

References Cited
UNITED STATES PATENTS 2,880,101   3/1959   Ulfstedt _____ 106—120

JAMES E. POER, Primary Examiner

U.S. Cl. X.R.

106—120